United States Patent
KaruppurRajagopalan et al.

(10) Patent No.: US 10,216,748 B1
(45) Date of Patent: Feb. 26, 2019

(54) SEGMENT INDEX ACCESS MANAGEMENT IN A DE-DUPLICATION SYSTEM

(71) Applicant: EMC Corporation, Hopkinton, MA (US)

(72) Inventors: Ganesh KaruppurRajagopalan, San Jose, CA (US); Mahesh Kamat, San Jose, CA (US); Subrahmanyam Josyula, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 500 days.

(21) Appl. No.: 14/871,749

(22) Filed: Sep. 30, 2015

(51) Int. Cl.
*G06F 7/00* (2006.01)
*G06F 17/30* (2006.01)

(52) U.S. Cl.
CPC .. *G06F 17/30091* (2013.01); *G06F 17/30156* (2013.01); *G06F 17/30371* (2013.01)

(58) Field of Classification Search
CPC ......... G06F 17/30312; G06F 17/30631; G06F 17/30321; G06F 17/30156
See application file for complete search history.

(56) References Cited

U.S. PATENT DOCUMENTS

| | | | |
|---|---|---|---|
| 6,667,700 B1 * | 12/2003 | McCanne | H03M 7/30 341/50 |
| 7,065,619 B1 | 6/2006 | Zhu et al. | |
| 7,434,015 B2 | 10/2008 | Zhu et al. | |
| 7,454,443 B2 | 11/2008 | Ram et al. | |
| 7,620,766 B1 | 11/2009 | Waldspurger | |
| 7,716,180 B2 | 5/2010 | Vermeulen et al. | |
| 7,725,437 B2 | 5/2010 | Kirshenbaum et al. | |
| 7,730,058 B2 | 6/2010 | Sareen et al. | |
| 7,743,013 B2 | 6/2010 | Mityagin et al. | |
| 7,769,967 B2 * | 8/2010 | Zhu | G06F 3/0608 711/100 |
| 7,849,063 B2 | 12/2010 | Stata et al. | |
| 8,108,446 B1 * | 1/2012 | Christiaens | G06F 3/0608 707/693 |

(Continued)

FOREIGN PATENT DOCUMENTS

| | | |
|---|---|---|
| CN | 101359325 | 2/2009 |
| CN | 101398820 | 4/2009 |

OTHER PUBLICATIONS

Benjamin Zhu et al: "Avoiding the Disk Bottleneck in the Data Domain Deduplication File System", Proceedings of the 6th USENIX Conference on File and Storage Technologies (FAST'08), Feb. 29, 2008 (Feb. 29, 2008), pp. 269-282, XP05511 0329.

*Primary Examiner* — Hasanul Mobin
(74) *Attorney, Agent, or Firm* — Womble Bond Dickinson (US) LLP

(57) ABSTRACT

Techniques to perform segment index lookups are disclosed. In various embodiments, for each of one or more segment index entries included in a first on disk segment index a corresponding set of values is stored in a bloom filter. The bloom filter is used to determine prior to performing an on disk segment lookup of the segment index with respect to a given segment whether each location in the bloom filter that is associated with the given segment has been set to said corresponding set of values. An on disk lookup is performed in parallel of a second on disk segment index that is not included in said subset of on disk segment indexes each of which has associated therewith a corresponding bloom filter.

20 Claims, 6 Drawing Sheets

(56) References Cited

U.S. PATENT DOCUMENTS

| | | | |
|---|---|---|---|
| 8,290,972 B1 | 10/2012 | Deshmukh et al. | |
| 8,396,873 B2 | 3/2013 | Xie | |
| 8,676,865 B2* | 3/2014 | Han | G06F 17/30958 707/808 |
| 8,751,448 B1* | 6/2014 | Douglis | G06F 3/0641 707/626 |
| 2005/0044108 A1 | 2/2005 | Shah et al. | |
| 2005/0187917 A1 | 8/2005 | Lawande et al. | |
| 2006/0112112 A1 | 5/2006 | Margolus et al. | |
| 2007/0168516 A1 | 7/2007 | Liu et al. | |
| 2008/0256143 A1* | 10/2008 | Reddy | G06F 17/30312 |
| 2009/0182726 A1 | 7/2009 | Wang | |
| 2009/0187546 A1 | 7/2009 | Hamilton Whyte | |
| 2011/0093439 A1* | 4/2011 | Guo | G06F 11/1453 707/679 |
| 2011/0225191 A1* | 9/2011 | Xie | G06F 17/30312 707/775 |
| 2012/0143715 A1* | 6/2012 | Eshghi | G06F 17/30159 705/26.3 |
| 2012/0166771 A1* | 6/2012 | Ringseth | G06F 8/31 712/220 |
| 2014/0122509 A1* | 5/2014 | Pantaleoni | G06F 17/30023 707/754 |
| 2014/0279847 A1* | 9/2014 | Schreter | G06F 17/30162 707/609 |
| 2014/0281212 A1* | 9/2014 | Schreter | G06F 3/0674 711/112 |
| 2015/0220554 A1* | 8/2015 | Kishi | G06F 3/0641 707/692 |
| 2017/0068727 A1* | 3/2017 | Rubin | G06F 17/3033 |

* cited by examiner

SEGMENT INDEX ACCESS MANAGEMENT IN A DE-DUPLICATION SYSTEM

BACKGROUND OF THE INVENTION

De-duplicating storage systems, such as EMC® Data Domain® storage systems, employ a "segment index" to keep track of data segments that have already been stored. For each segment that has been stored, a fingerprint (e.g., hash) may be used to create an index entry that represents the segment and indicates a location in which the segment has been stored, e.g., a specific container or other logical structure or set of segment data. If a subsequently received segment is the same as a segment that has already been stored, a reference to the segment as stored previously may be provided and/or used, instead of storing the same segment again.

A segment index may be stored on disk, e.g., striped across a set of n disks. Performing a query against such an index may require random access input/output (I/O) operations with respect to the drive(s) on which the segment index are stored. As de-duplicating storage systems become larger and larger in scale, and as hard disk drives become increasing dense, the cost of such I/O operations may increase.

BRIEF DESCRIPTION OF THE DRAWINGS

Various embodiments of the invention are disclosed in the following detailed description and the accompanying drawings.

DETAILED DESCRIPTION

Figure 1:
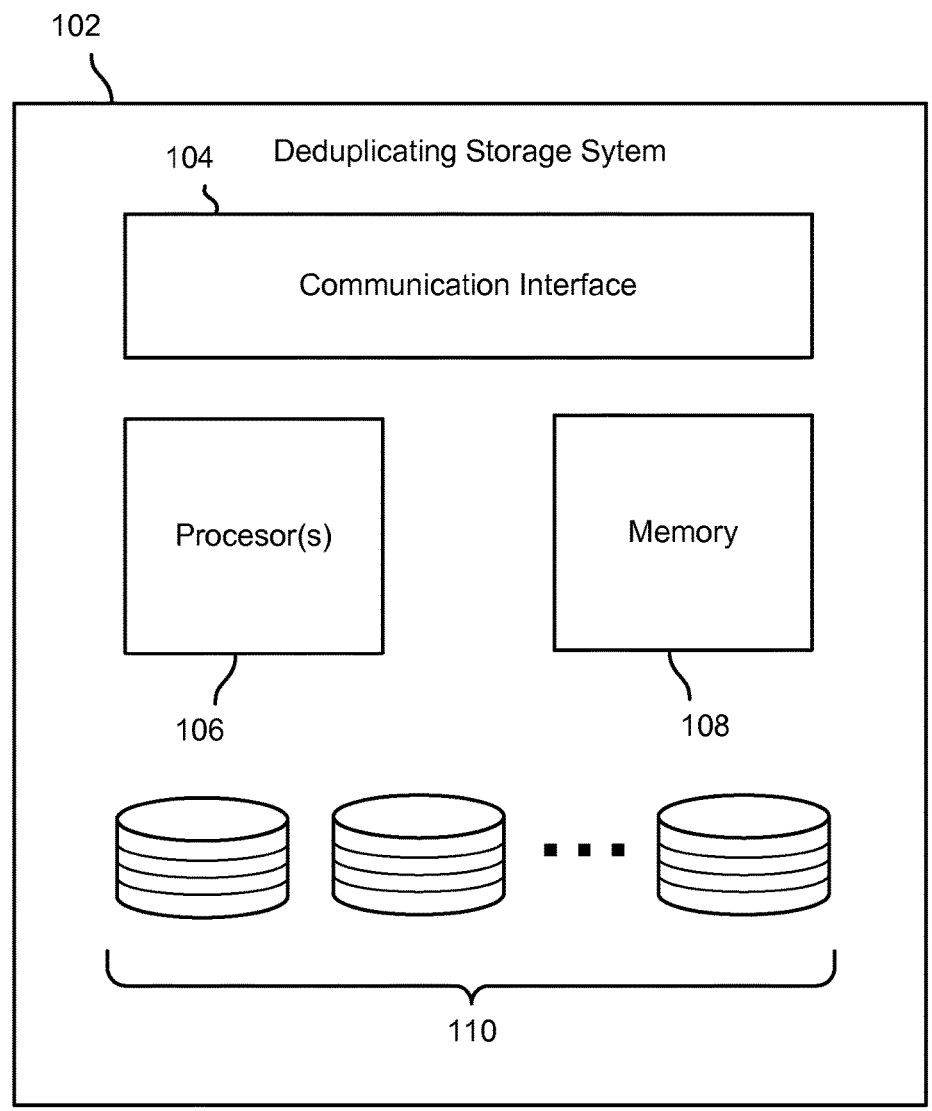
FIG. 1 is a block diagram illustrating an embodiment of a de-duplicating storage system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to perform segment index lookups efficiently in the context of a de-duplicating storage system are disclosed. In various embodiments, a set of two or more indexes may be maintained. A primary or backend segment index may be provided and used to track all segments comprising a given segment store. One or more partial or frontend segment indexes may be used to track a subset of segments in the segment store, such as segments that have been stored or accessed relatively more recently. In various embodiments, the frontend index(es) may be smaller than the primary or backend segment index, enabling more recent stored/accessed segments to be found more readily.

In various embodiments, techniques disclosed herein may be used to avoid looking up segments on disk for at least a subset of index(es). For example, for each frontend index as described above, a bloom filter or other in memory data structure may be used to enable a determination to be made quickly that a given segment does not have any corresponding entry in the index with which the bloom filter or other data structure is associated.

In some embodiments, a bloom filter may be used. A characteristic of a bloom filter is that the absence of an item in a set with which the bloom filter is associated can be determined quickly and with high reliability. In some embodiments, a bloom filter is checked before an on disk index lookup is performed. If the bloom filter check indicates the segment is not represented in the index, no on disk lookup is performed with respect to that index.

In various embodiments, a bloom filter may be used to avoid looking up segments on disk for a first subset of indexes, while performing a lookup independently and in parallel of one or more other indexes, such as a primary or backend index as described above. For example, in some embodiments, a determination may be made based on the relative sizes of indexes in a related set of indexes to use a bloom filter as described herein only with respect to one or more relatively smaller indexes while not using such a filter with respect to one or more larger indexes. For example, a primary or backend index may represent 90% or more of segments stored in a segment store. In some embodiments, a bloom filter may not be used as described herein, since the likelihood of finding a segment may be considered to be relatively high, and the risk of a false positive result from the bloom filter query considered high in any event.

In various embodiments, using a bloom filter with respect to a subset of relatively smaller indexes, while in parallel performing an on disk lookup of a relatively larger index, enables segment entries to be found quickly, but without an excessive number of input/output operations (I/O's or "iops") being performed.

FIG. 1 is a block diagram illustrating an embodiment of a de-duplicating storage system. In the example shown, de-duplicating storage system 102 includes a communication interface 104, such as a network interface card or other communication interface. De-duplicating storage system 102 further includes one or more processors 106, memory 108, and a set of n hard disk drives 110.

In various embodiments, processor 106 may execute computer instructions stored in memory 108 to provide de-duplicating storage functionality with respect to data stored on disk drives 110. For example, processor 106 may be configured to provide de-duplicated storage of data objects, such as files, received via communication interface 104, e.g., from client computer systems that have connectivity to de-duplicating 102 via a network (not shown).

In various embodiments, de-duplicating storage system 102 may provide de-duplicated storage at least in part by segmenting received data into segments of a certain (approximate or average) size, e.g., 4 KB; generating for each segment a corresponding fingerprint, such as a hash computed based on all or part of the segment data; and using the fingerprint to determine whether the same segment data has been stored previously. In some embodiments, using the fingerprint to determine whether the same segment data has been stored previously may include query a segment index to determine whether an entry associated with the fingerprint is already present in the index. If so, the index entry may be used to return a pointer to the segment as stored previously, e.g., an identifier of a container or other logical storage location in which the segment is stored. Otherwise, the segment is stored and a new segment index entry is created for the segment.

In various embodiments, the segment index may be a large on disk hash table which contains mappings from segment fingerprint to container id. In some embodiments, there may be up to three on-disk index files, e.g., a Level 1 index, a Level 2 index, and a Level 0 index. The Level 1 and Level 2 index files may be smaller index files, relative to the Level 0 index, and may contain only a small percentage of fingerprints present in the system, such as only fingerprints associated with recently stored and/or accessed segments. In some embodiments, Level 1 and Level 2 indexes may include segment index entries for up to 6% of the segments in the segment store. In some embodiments, the size of the Level 1 and/2 indexes may be configurable, to enable an administrator to set the maximum (absolute or relative) size to which such indexes will be allowed to grow (e.g., through the addition of new segment index entries, for example as new segments are stored).

In various embodiments, each of the index files may be distributed across two or more hard disks, such as hard disks 110 in the example shown in FIG. 1. As such, index queries may involve I/O operations with respect to multiple disk drives.

Previously, when a segment index lookup for a fingerprint has been performed in some implementations, parallel I/O's have been issued to all the on disk index files. Alternatively, approaches have been disclosed in which a bloom filter has been used to determine whether an on disk lookup should be performed with respect to a Level 1 segment index, see, e.g., U.S. Pat. No. 8,396,873, entitled, "Index Searching Using a Bloom Filter." However, in such previously-disclosed approaches, the bloom filter was checked and, if indicated, the on disk lookup of the Level 1 index was performed and completed prior to any lookup being performed with respect to the Level 0 (sometimes referred to as the "primary" or "backend" segment index herein) being performed. In such an approach, however, a segment index stored only in the Level 0 index would not be looked up in the Level 0 index until after the delay associated with checking the bloom filter for the Level 1 index(es) and possible performing a lookup of the Level 1 index. In some embodiments, it may not be practical or useful to combine both a parallel approach to checking segment indexes and using bloom filters for each index, due to the memory and other resources that would be required to provide an effective bloom filter for the much larger Level 0 index.

Therefore, a hybrid, parallel architecture and approach is disclosed. In various embodiments, all segment indexes are checked concurrently (i.e., in parallel and independently of each other). For relatively smaller indexes, a bloom filter may be used, as described herein, to avoid unnecessary disk lookups. However, for relatively much larger indexes, such as a Level 0 index in a typical use scenario, the lookup is performed without using a bloom filter to attempt to avoid unnecessary lookups. In various embodiments, the hybrid, parallel approach disclosed herein enables segment index entries to be found, or the fact that no corresponding entry exists in any index determined, without using excessive memory resources or excessive disk I/O resources. Such an approach may be advantageous in implementations in which high density disk drives are used, since the number of I/O's available per unit time may be less in such systems than if a larger number of lower density drives were used.

In various embodiments, a bloom filter may be used to store information that may enable unnecessary I/O's to be avoided with respect to a subset of relatively smaller segment indexes. As index entries are added to such an index, e.g., in connection with storing a new segment, an associated bloom filter may be updated to reflect the addition of the index entry to the set of entries comprising the index. For example, a bloom filter or similar structure may be stored in memory 108 of FIG. 1. If a segment lookup is to be performed, a lookup on the bloom filter may be performed to determine whether an entry for the segment may be present in the index. If the result of the lookup on the bloom filter indicates the segment may be represented in the index, a segment lookup on the on disk index is performed. Since it is a characteristic of a bloom filter that it has zero false negatives, a bloom filter lookup will conclusively inform index regarding the absence of the fingerprint in the index file. As a result, if the result of the lookup on the bloom filter indicates the segment is not represented in the index, no lookup on the on disk index is performed.

Figure 2A:
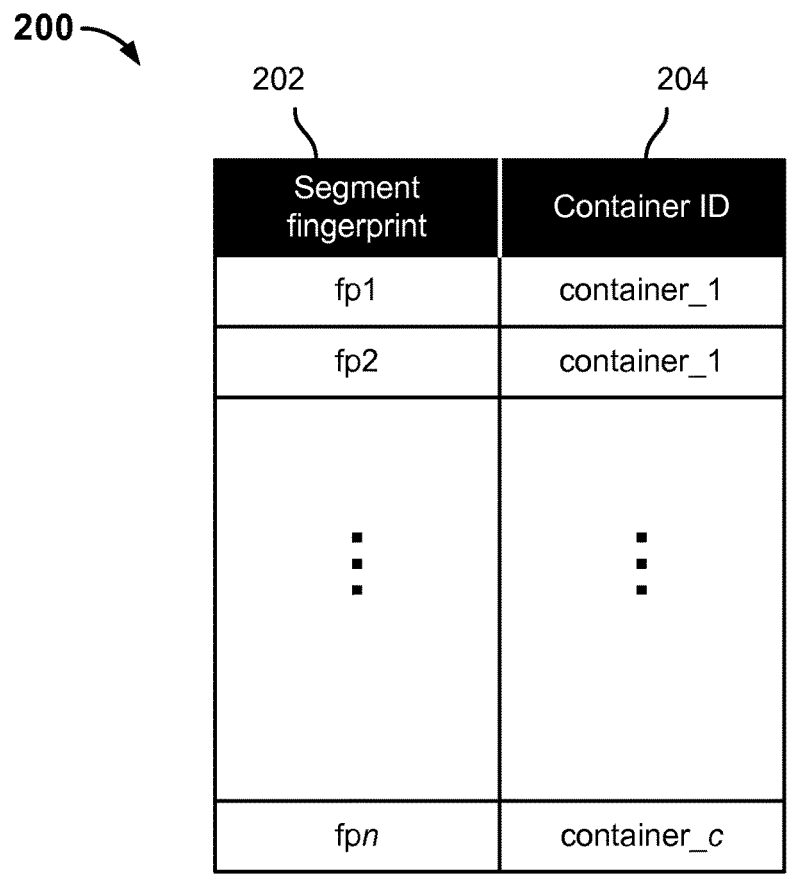
FIG. 2A is a block diagram illustrating an example of a segment index in an embodiment of a de-duplicating storage system.

FIG. 2A is a block diagram illustrating an example of a segment index in an embodiment of a de-duplicating storage system. In various embodiments, a segment index as illustrated in FIG. 2A may be implemented and used by a de-duplicating storage system, such as de-duplicating storage system 102 of FIG. 1, to track segments that have been stored and to determine whether a received segment has been stored previously. In some embodiments, a segment index as illustrated may be stored on disk, e.g., in parts distributed across two or more disks such as disks 110 of FIG. 1.

In the example shown in FIG. 2A, segment index 200 comprises a data structure, in this example a table, that includes a first column 202 in which segment fingerprints of previously-stored segments are stored, and a second column 204 in which for each segment (identified in the first column 202 by its segment fingerprint) a corresponding container ID of a container in which that segment is stored.

In operation, a segment lookup may be performed using a segment index such as index 200 of FIG. 2A. For example, a segment of a data object, such as a file, that has been requested to be stored may be received. A fingerprint of the segment may be computed and used to perform a segment lookup in the segment index 200. If the segment is found, the corresponding container ID may be read and returned as the storage location of the segment with respect to the data object that is being stored. If the segment is not found, the segment may be stored in a container, and a new entry for the segment (including its fingerprint and the container ID of the container in which the segment has been stored) may be added to segment index 200.

Figure 2B:
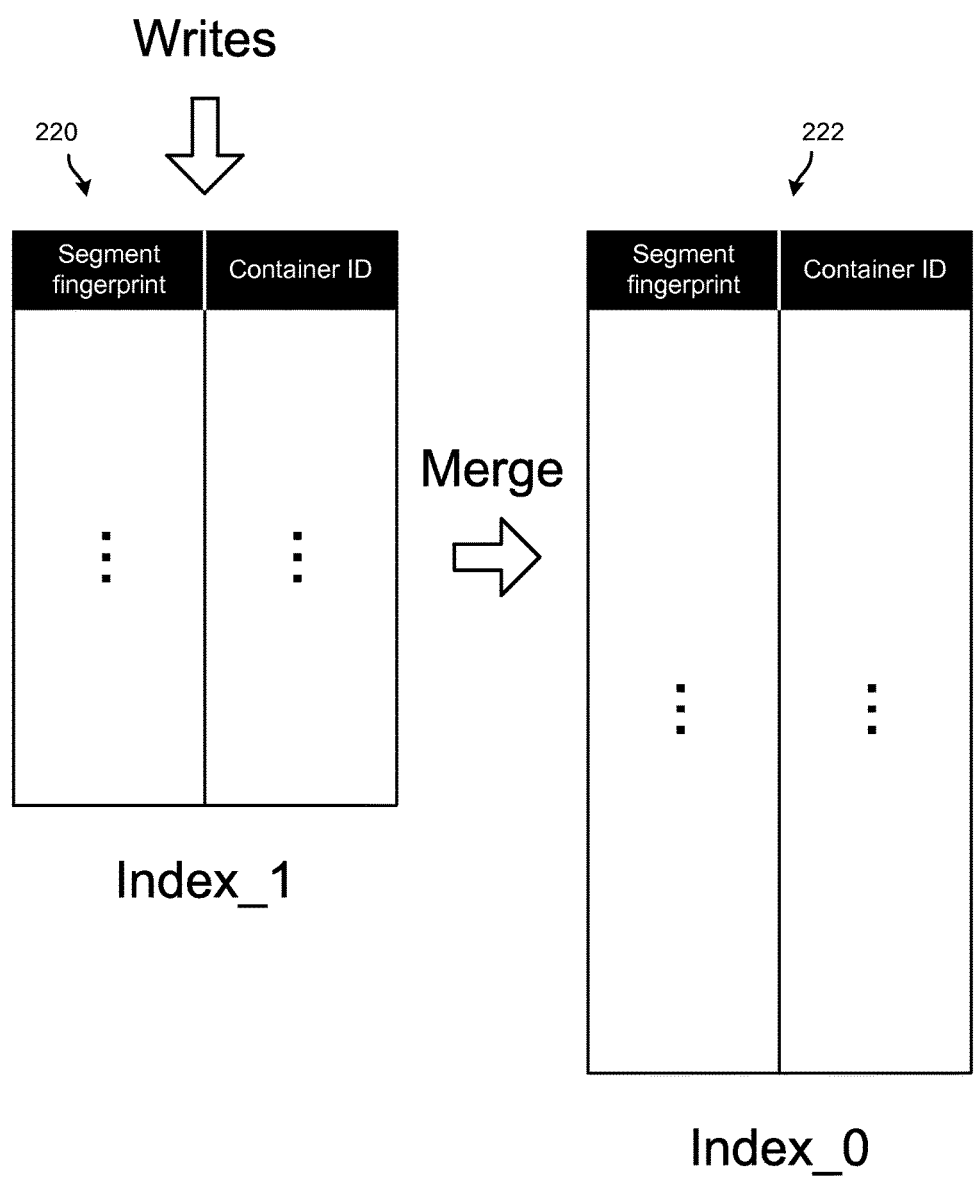
FIG. 2B is a block diagram illustrating an example of a multi-part segment index in an embodiment of a de-duplicating storage system.

FIG. 2B is a block diagram illustrating an example of a multi-part segment index in an embodiment of a de-duplicating storage system. In the example shown, a multi-part segment index is illustrated that includes a first segment index 220 and a second segment index 222. Segments associated with relatively more recent "write" operations are reflected initially in the first segment index 220. Periodically, continuously, and/or otherwise, segment index entries in the first segment index 220 are merged into the second segment index 222. Over time, the second segment index 222 grows to be potentially much larger than the first segment index 220, since only more recently added segments are tracked in the former index.

In various embodiments, segment lookups may be performed at least in part by querying the first segment index 220 and the second segment index 222 in parallel. The first query result that returns a container ID for the segment being looked up may be used to retrieve the segment, for example. In some embodiments, the first segment index 220 and the second segment index 222 each may be stored in parts distributed across at least a subset of hard disk drives comprising a de-duplicating storage system, such as hard disk drives 110 of FIG. 1. As a result, segment lookups conducted in parallel in both the first segment index 220 and the second segment index 222 may require many I/O's to the hard disk drives on which the respective indexes are stored.

In some embodiments, a segment index may include more than two parts, resulting in even more I/O's being required to perform segment lookups in parallel.

In various embodiments, a bloom filter or similar tracking data structure may be used to avoid unnecessary segment lookups on at least a subset of indexes comprising a multi-part segment index.

Figure 3A:
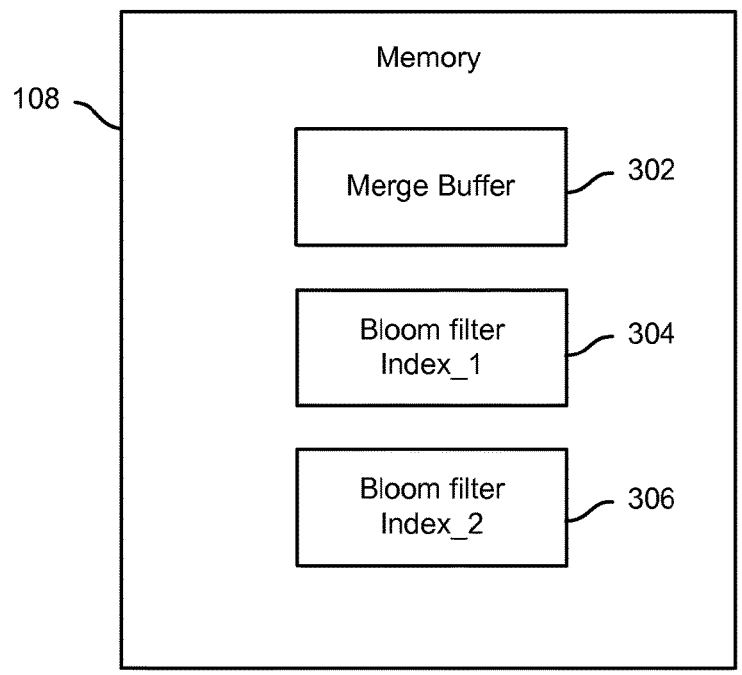
FIG. 3A is a block diagram illustrating an example of in-memory data structures in an embodiment of a de-duplicating storage system.

FIG. 3A is a block diagram illustrating an example of in-memory data structures in an embodiment of a de-duplicating storage system. In various embodiments, the in-memory data structures shown in FIG. 3A may be provided on a de-duplicating storage system, such as de-duplicating storage system 102 of FIG. 1, and may be used to manage segment index lookups, e.g., to avoid unnecessary lookups, using techniques disclosed herein. In the example shown, memory 108 of FIG. 1 is shown to have stored thereon a merge buffer 302, a first bloom filter 304, and a second bloom filter 306.

In various embodiments, merge buffer 302 may be used to buffer segment index entries associated with recently written segments. For example, as a segment to be written is received, the de-duplicating storage system may be configured to determine, e.g., via a segment lookup, whether the segment has been stored previously. If it is determined the segment has not been stored previously, the segment may be stored (e.g., in a given container) and a segment index entry for the segment may be stored initially in merge buffer 302. From time to time, or on demand as the merge buffer 302 becomes too full, etc., the de-duplicating storage system may be configured to merge segment index entries stored in merge buffer 302 into a segment index stored on disk, such as the first segment index 220 of FIG. 2B.

When a request to store or access a segment is received, in some embodiments the de-duplicating storage system may be configured to first check the merge buffer 302 to determine whether a segment index entry for the segment is found there. If so, a response to the segment lookup may be provided based on the segment index entry as stored in the merge buffer 302. If not, a segment index lookup as disclosed herein may be performed.

In various embodiments, a segment index lookup may be performed at least in part by checking one or both of the bloom filters 304, 306 stored in memory 108. In some embodiments, a segment index may include three parts, including a primary index in which all or most segments are represented and two smaller indexes in which only a subset of segments may be represented, e.g., more recently stored and/or accessed segments. In some embodiments, each of the smaller segment indexes (or partial indexes) may be associated with a corresponding one of the bloom filters 304, 306 stored in memory 108.

Bloom filters may be used to keep track of items included in a set. A characteristic of a bloom filter is that a false positive may be possible but a false negative is not. Stated another way, if data stored in a bloom filter indicates that an item is not (yet) a member of the associated set, the item definitively is not in the set. In various embodiments, this characteristic of a bloom filter (e.g., 304, 306) is used to avoid unnecessary on disk segment index lookups. For example, in various embodiments, a segment lookup may include computing locations associated with the segment in a bloom filter associated with a segment index (e.g., 304, 306). If data stored in any one of the locations indicates a negative result, the segment is determined to not be represented in that segment index and no on disk lookup is performed with respect to that index.

Figure 3B:
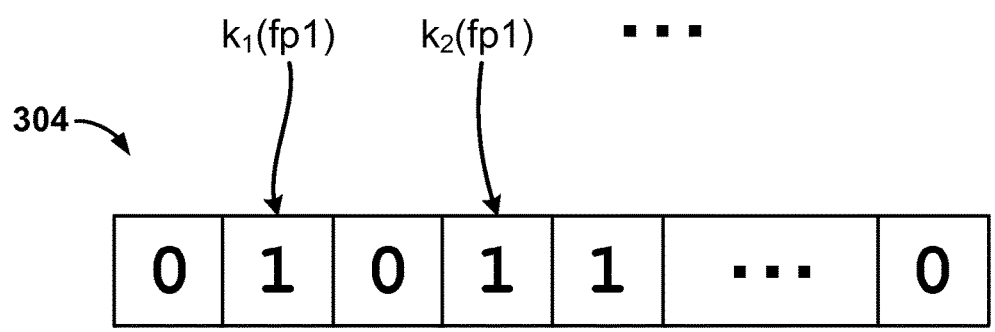
FIG. 3B is a block diagram illustrating an example of a bloom filter in an embodiment of a de-duplicating storage system.

FIG. 3B is a block diagram illustrating an example of a bloom filter in an embodiment of a de-duplicating storage system. In various embodiments, one or both of the bloom filters shown in FIG. 3A may comprise a bloom filter as shown in FIG. 3B. In the example shown, bloom filter 304 comprises a set of m storage locations, each set initially to store a default value, e.g., "0". For each segment index entry added to a segment index with which the bloom filter is associated, an associated segment fingerprint and/or other data representative of the segment is used to compute a set of locations k, each of which is set or verified to have already been set to a "set" value, e.g., "1". Subsequently, if the same segment were received or requested, the same corresponding locations would be computed, and upon checking those locations it would be determined that each had been set to the "set" value, indicating the segment may have an entry in the index. (Note that locations associated with a given segment may become set as a result of having added entries previously to one or more other segments, the combined set of associated locations in bloom filter 304 might happen to include the locations associated with the segment of interest, even if the segment of interest does not have an entry in the list, i.e., a false positive result is possible.)

In various embodiments, if any location in bloom filter 304 that has been computed to be associated with a segment of interest has not been set to the "set" value, it is determined that the segment does not have a corresponding entry in the index with which bloom filter 304 is associated, and based on that determination no on disk lookup is performed with respect to that index.

Figure 4:
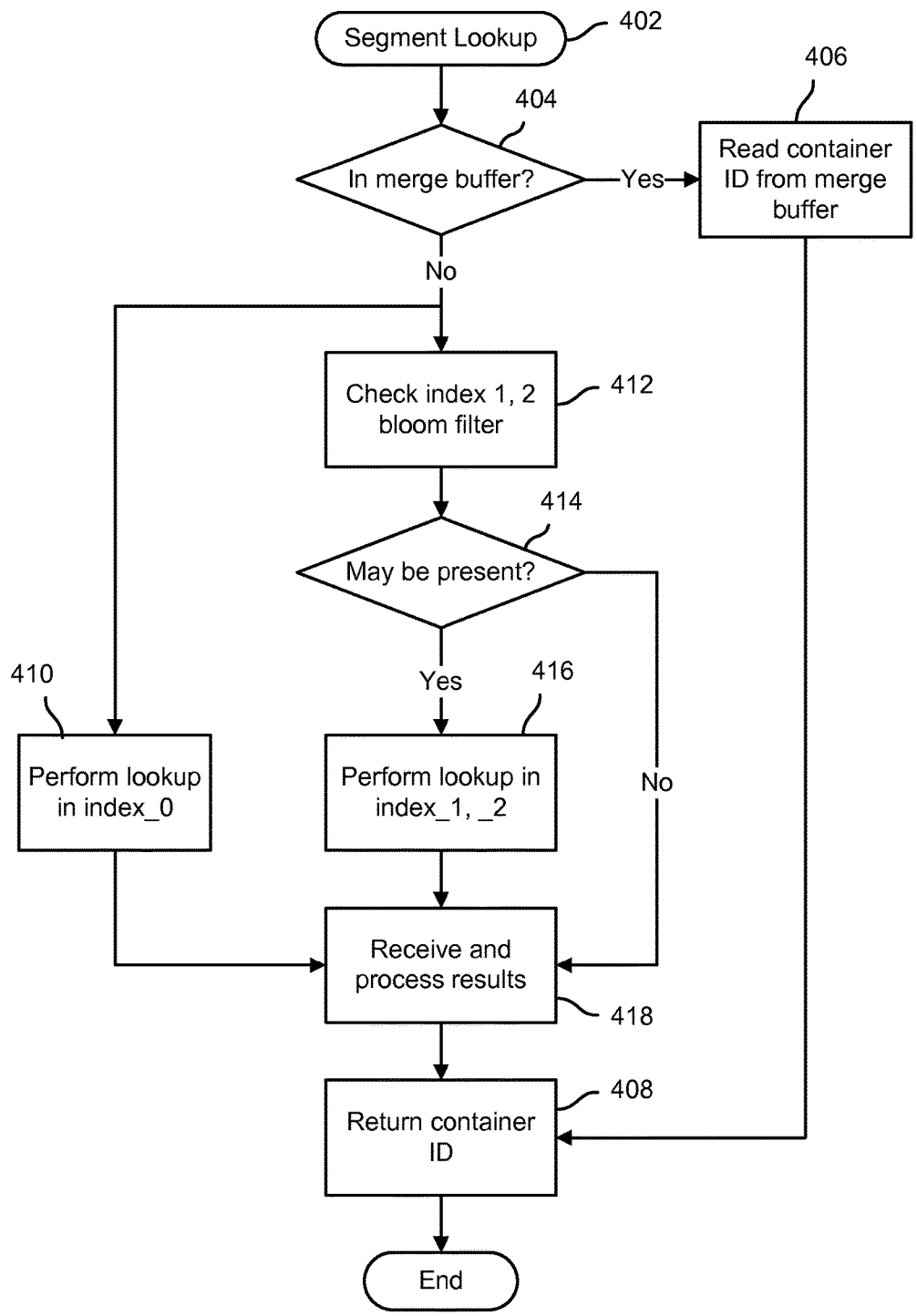
FIG. 4 is a flow chart illustrating an embodiment of a process to perform a segment lookup in an embodiment of a de-duplicating storage system.

FIG. 4 is a flow chart illustrating an embodiment of a process to perform a segment lookup in an embodiment of a de-duplicating storage system. In various embodiments, the process of FIG. 4 may be performed by a de-duplicating storage system, such as de-duplicating storage system 102 of FIG. 1, e.g., using in-memory data structures such as those shown in FIGS. 3A and 3B. In the example shown, an indication to perform a segment lookup is received (402). For example, a request to store and/or access a segment may have been received. A merge buffer, such as merge buffer 302 of FIG. 3A, is checked to determine whether a segment index entry associated with the segment is present in the merge buffer (404). If so, the entry is read from the merge buffer to determine the container ID of the container in which the segment is stored (406), and the container ID so determined is returned as a result of the segment lookup (408).

If no entry for the segment is found in the merge buffer (404), a lookup is performed with respect to a primary and/or more comprehensive segment index (410) in parallel with a check being performed in one or more bloom filters (two in this example), each associated with a corresponding partial segment index each associated with a subset segments stored in the segment store with which all the respective indexes are associated (412). If the check of any one or more of the bloom filters indicates a segment index entry for the segment may be present in the index with which that bloom filter is associated (414), an on disk segment lookup is performed with respect to that index (416). Conversely, for any bloom filter a check of which (412) indicates no segment index entry associated with the segment of interest is present in the segment index with which that bloom filter is associated (414), no on disk lookup is performed with respect to that segment index.

Results of the on disk segment lookup performed with respect to the primary segment index (410) and of any on disk lookups performed with respect to any partial index(es) associated with a bloom filter (412, 414, 416), if any, are received and processed (418) to determine a container ID of a container in which the segment is stored, and the determined container ID is returned as a result of the segment lookup (408), after which the process ends.

While in the example shown in FIG. 4 the "primary" segment index did not have a bloom filter associated therewith, in various embodiments bloom filters may be used to avoid unnecessary on disk lookups with respect to all parts of the segment index.

Figure 5:
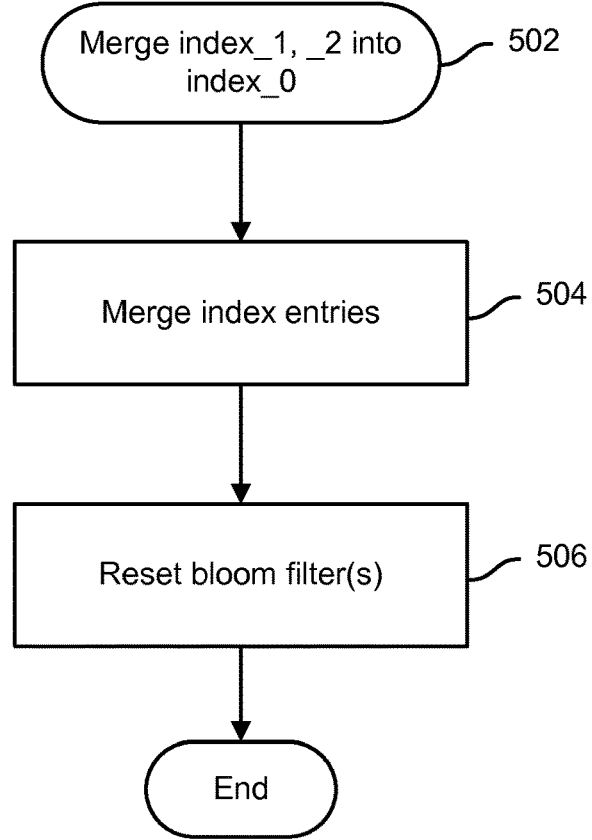
FIG. 5 is a flow chart illustrating an embodiment of a process to merge indexes in an embodiment of a de-duplicating storage system.

FIG. 5 is a flow chart illustrating an embodiment of a process to merge indexes in an embodiment of a de-duplicating storage system. In various embodiments, the process of FIG. 5 may be implemented by a de-duplicating storage system, such as de-duplicating storage system 102 of FIG. 1. In the example shown, an indication is received to merge partial indexes, such as index 220 of FIG. 2B and/or index_1 and index_2 of FIG. 4, into a primary index, such as index 222 of FIG. 2B and/or index_0 of FIG. 4 (502). For example, the respective partial indexes may have reached a prescribed size associated with merging entries into the primary index, or some other criteria may have triggered the merge operation. Segment index entries in the index(es) to be merged into the primary index are copied over to the primary index and then deleted from the partial index (504). Once all entries have been merged into the primary index and deleted from the partial index, the associated bloom filter is reset (506), e.g., to all "0" values. Resetting the bloom filter makes it ready once again to be used to track segment index entries as they are added to the associated segment index.

In various embodiments, techniques disclosed herein may be used to reduce I/O requirements, e.g., I/O's associated with on-disk index lookups, which may boost performance of de-duplicating storage systems even when a fewer number of high density hard disk drives are used to store the index.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    storing in a bloom filter, for each of one or more segment index entries included in a first on disk segment index that is included in a subset of on disk segment indexes each of which has associated therewith a corresponding bloom filter, a corresponding set of values, each at a location in the bloom filter that is determined based at least in part on data associated with the segment index entry;
    using the bloom filter to determine prior to performing an on disk segment lookup of the segment index with respect to a given segment whether each location in the bloom filter that is associated with the given segment has been set to a value comprising said corresponding set of values; and
    performing an on disk lookup, in parallel with and independently of said storing in the bloom filter and using the bloom filter, of a second on disk segment index that is not included in said subset of on disk segment indexes each of which has associated therewith a corresponding bloom filter, wherein the second on disk segment index is larger than the first on disk segment index in size, and wherein based on a size of the first on disk segment index, the first on disk segment index is associated with a corresponding bloom filter, and based on a size of the second on disk segment index, the second on disk segment index is not associated with a corresponding bloom filter.

2. The method of claim 1, wherein the bloom filter is stored in memory.

3. The method of claim 1, wherein the corresponding set of values is stored for a particular segment in connection with storing the particular segment in a segment store comprising a de-duplicating storage system.

4. The method of claim 1, wherein each location in the bloom filter is determined at least in part by using a function to compute the location based on data comprising or otherwise associated with the segment.

5. The method of claim 4, wherein the data comprising or otherwise associated with the segment comprises a fingerprint computed based on data comprising the segment.

6. The method of claim 1, further comprising concluding based at least in part on a determination that at least one location in the bloom filter that is associated with the given segment has not been set of a value consistent with the corresponding set of values that the given segment is not represented by a segment index entry in the segment index.

7. The method of claim 1, wherein the segment index comprises a partial segment index that is associated with one or more other segment indexes associated with a common segment store.

8. The method of claim 7, further comprising merging segment index entries stored in the partial segment index into a primary segment index, and resetting the bloom filter.

9. The method of claim 1, wherein storing the corresponding set of values comprises setting each location to a set value.

10. The method of claim 1, further comprising performing an on disk lookup of the segment index based at least in part on a determination that each location in the bloom filter that is associated with the given segment has been set of a value comprising said corresponding set of values.

11. A system, comprising:
a memory; and
a processor coupled to the memory and configured to:
store in a bloom filter stored in said memory, for each of one or more segment index entries included in a first on disk segment index that is included in a subset of on disk segment indexes each of which has associated therewith a corresponding bloom filter, a corresponding set of values, each at a location in the bloom filter that is determined based at least in part on data associated with the segment index entry;
use the bloom filter to determine prior to performing an on disk segment lookup of the segment index with respect to a given segment whether each location in the bloom filter that is associated with the given segment has been set to a value comprising said corresponding set of values; and
perform an on disk lookup, in parallel with and independently of said storing in the bloom filter and using the bloom filter, of a second on disk segment index that is not included in said subset of on disk segment indexes each of which has associated therewith a corresponding bloom filter, wherein the second on disk segment index is larger than the first on disk segment index in size, and wherein based on a size of the first on disk segment index, the first on disk segment index is associated with a corresponding bloom filter, and based on a size of the second on disk segment index, the second on disk segment index is not associated with a corresponding bloom filter.

12. The system of claim 11, wherein the bloom filter is stored in the memory by the processor.

13. The system of claim 11, wherein the corresponding set of values is stored for a particular segment in connection with storing the particular segment in a segment store comprising a de-duplicating storage system.

14. The system of claim 11, wherein each location in the bloom filter is determined at least in part by using a function to compute the location based on data comprising or otherwise associated with the segment.

15. The system of claim 14, wherein the data comprising or otherwise associated with the segment comprises a fingerprint computed based on data comprising the segment.

16. The system of claim 11, wherein the processor is further configured to conclude based at least in part on a determination that at least one location in the bloom filter that is associated with the given segment has not been set of a value consistent with the corresponding set of values that the given segment is not represented by a segment index entry in the segment index.

17. The system of claim 11, wherein the segment index comprises a partial segment index that is associated with one or more other segment indexes associated with a common segment store.

18. The system of claim 17, wherein the processor is further configured to merge segment index entries stored in the partial segment index into a primary segment index, and reset the bloom filter.

19. The system of claim 11, wherein the processor is further configured to perform an on disk lookup of the segment index based at least in part on a determination that each location in the bloom filter that is associated with the given segment has been set to a value comprising said corresponding set of values.

20. A computer program product embodied in a non-transitory computer readable storage medium and comprising computer instructions for:
storing in a bloom filter, for each of one or more segment index entries included in a first on disk segment index that is included in a subset of on disk segment indexes each of which has associated therewith a corresponding bloom filter, a corresponding set of values, each at a location in the bloom filter that is determined based at least in part on data associated with the segment index entry;
using the bloom filter to determine prior to performing an on disk segment lookup of the segment index with respect to a given segment whether each location in the bloom filter that is associated with the given segment has been set to a value comprising said corresponding set of values; and
performing an on disk lookup, in parallel with and independently of said storing in the bloom filter and using the bloom filter, of a second on disk segment index that is not included in said subset of on disk segment indexes each of which has associated therewith a corresponding bloom filter, wherein the second on disk segment index is larger than the first on disk segment index in size, and wherein based on a size of the first on disk segment index, the first on disk segment index is associated with a corresponding bloom filter, and based on a size of the second on disk segment index, the second on disk segment index is not associated with a corresponding bloom filter.

* * * * *